April 20, 1943.  W. T. HANCOCK  2,316,954
METHOD OF TREATING PETROLEUM HYDROCARBONS
Filed June 9, 1939
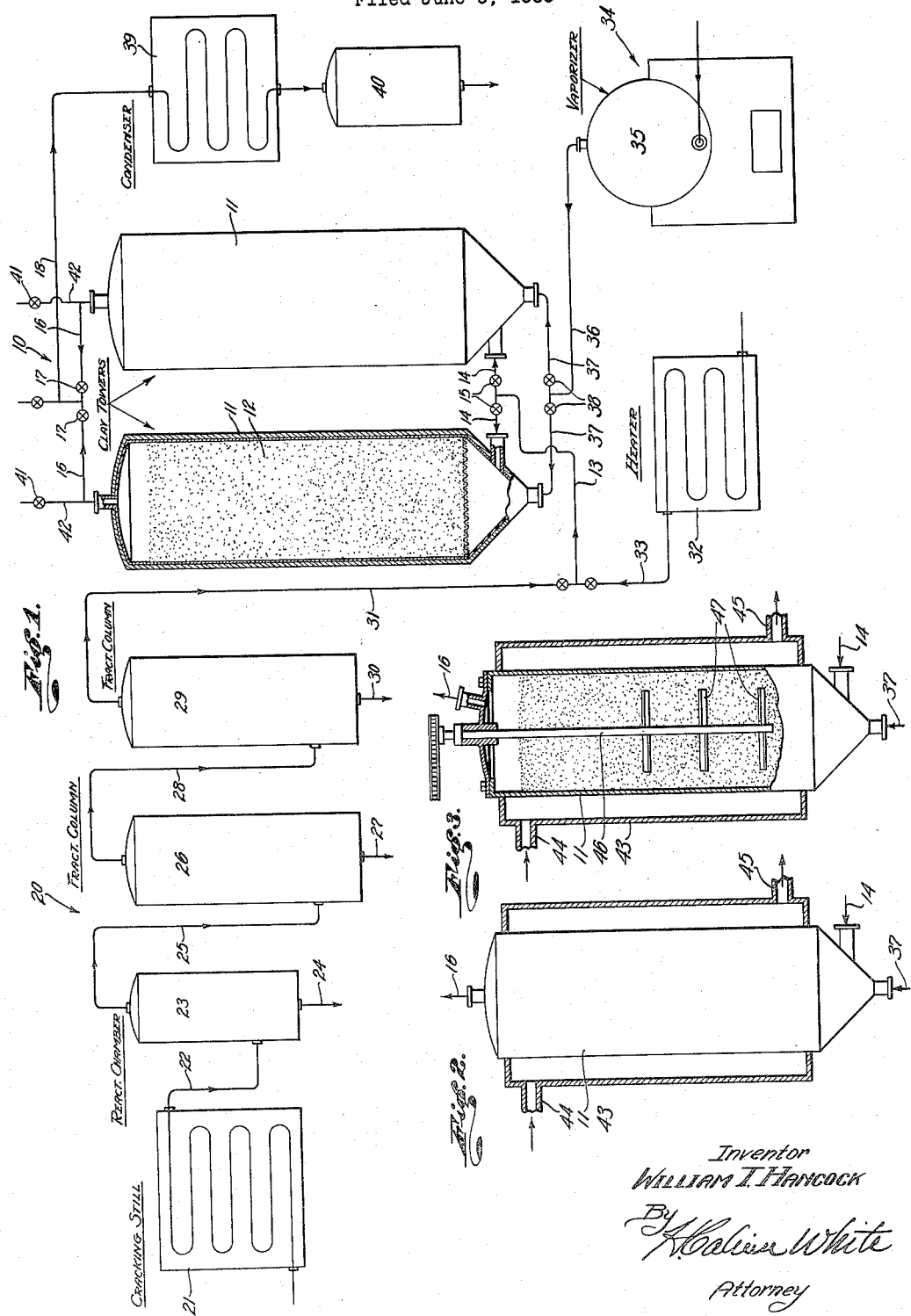
Inventor
WILLIAM T. HANCOCK
Attorney Patented Apr. 20, 1943

2,316,954

UNITED STATES PATENT OFFICE 2,316,954

METHOD OF TREATING PETROLEUM HYDROCARBONS

William T. Hancock, Long Beach, Calif., assignor to Hancock Oil Company of California, Long Beach, Calif., a corporation of California Application June 9, 1939, Serial No. 278,230

5 Claims. (Cl. 196—28)

This invention has to do with the refining of petroleum oils by treatment with adsorptive materials such as fuller's earth, bentonite, Muroc clay and the like, and deals particularly with an improved method whereby it is made possible alternately to treat the oil with the clay and then to recharge the clay with materials capable of increasing its effectiveness, while the clay remains in the treating zone. The present application is a continuation in part of my co-pending application Serial No. 220,328 filed July 20, 1938, on Oil treating clay and method of preparing same.

By incorporating in an adsorptive clay certain electrolytes or inorganic salts, it is possible to materially increase the treating effectiveness of the clay, at least for certain purposes and the removal of particular impurities in the oil. In its broad aspects, the present invention contemplates impregnation of the clay with such electrolytes or salts as are capable of being vaporized and condensed within the clay. Preferably, I treat the clay with a suitable vaporized metallic chloride, for example, either or both aluminum chloride or zinc chloride. For facility and convenience in the description to follow, I shall refer to the use of aluminum chloride as the clay impregnating salt, with the understanding, however, that aluminum chloride is to be regarded as typical of the vaporizable salts that are capable of enhancing the treating qualities of the clay.

I am aware of the fact that heretofore, hydrocarbon treating clays have been conditioned by washing them with solutions of electrolytic salts, for example an aqueous solution of aluminum sulphate. In that type of process, the clay, after treatment by the salt solution, requires drying and frequently crushing or grinding where in the course of its treatment, the clay has become compacted into briquettes or other massed form. Further, that type of process does not lend itself, at least in the manner of my invention, to alternate conditioning of the clay and treatment of the oil while the clay remains in the treating zone. I am also aware of previous proposals to inject a vaporized metallic chloride into a stream of hydrocarbons subsequently passed through adsorptive clay. That type of process does not precondition the clay independently of the passage of hydrocarbons therethrough, and it does not permit of comparable effectiveness or a degree of impregnation or control over the conditions required in accordance with the invention for proper impregnation of the clay with the chloride.

My invention has a distinct advantage in that it entirely eliminates any drying out or crushing operations following treatment of the clay with the salt. I simply vaporize the salt, condense the vapors within the adsorbent clay, and thus produce an impregnated clay immediately ready for treatment of the oil. Also the process may be employed to repeatedly charge or condition the clay in the oil treating chamber between successive runs, without having each time to remove the body of clay. Thus, for example, I may provide two clay towers or columns, and while the oil is passing through one, the other may be taken off stream and recharged by admitting aluminum chloride vapors and condensing them uniformly within the clay. Two particular advantages result from the use of an adsorptive clay, acid treated or not, impregnated in substantially dry condition with condensed aluminum chloride.

First, aluminum chloride is found to be effective as an agent for removing sulphur and sulphur compounds from the oil. Second, the clay seems particularly active by reason of the fact that it is permitted to remain in dry and natural condition during and following impregnation with the electrolytic salt, as distinguished from a clay that has been wetted and then subjected to drying.

Further and more particular details of the invention and a typical adaptation of the process as applied to the conditioning of the clay in an oil treating system, will be more fully understood from the following description. Throughout the description reference is had to the accompanying drawing in which:

Fig. 1 is a diagrammatic view showing the battery of clay treating towers connected to a vaporizer for the impregnating substance and to typical sources of hydrocarbons to be treated;

Fig. 2 shows a variational form of tower which is jacketed to heat the clay independently of the vapors; and Fig. 3 shows a second variational form of column provided with means for both independently heating and agitating the clay.

In Fig. 1 of the drawing, the oil treating unit, generally indicated at 10, may comprise a pair of heat insulated shells or towers 11 containing a suitable adsorptive material, preferably a clay of the type mentioned hereinabove. The oil to be treated is supplied to the clay chambers from line 13 through branch lines 14, each of which contains a valve 15. The oil entering the base of an individual tower, passes upwardly through the clay 12 in direct and intimate contact therewith, and leaves the top of the tower through line 16 containing valve 17 and connecting with a common discharge line 18. It will be understood of course that the oil introduced from the supply line 13 may consist of any suitable type of oil, in liquid or vapor phase, containing polymerizable or sulphur containing bodies which are removable, or acted upon so as to render them removable, by the treated clay. For example, the oil under treatment may consist of cracked pressure distillate, or a fraction thereof, such as gasoline, in liquid phase heated to a temperature say in excess of 350° F.; or the cracked distillate or fraction may be passed through the clay in vapor phase at a temperature best suited to the removal of the particular type of objectionable constituents in the oil.

As illustrative of sources of hydrocarbons that may be taken for treatment in the clay columns, I show in Fig. 1 a typical cracking system, generally indicated at 20, from which gasoline containing vapors are delivered to the clay column supply line 13. The cracking system 20 is shown to comprise the usual tubular cracking still 21 from which the cracked oil stream is discharged through line 22 into the reaction chamber 23. The unvaporized residue is withdrawn from the latter through line 24 and the vapors discharged through line 25 into fractionating column 26. A higher boiling fraction, for example, within the fuel oil or gas oil range, is withdrawn from the column through line 27 and the vapors passed through line 28 to a second fractionating column 29. An intermediate fraction is withdrawn from column 29 through line 30 and the vapors taken off through line 31 which connects with the column charging line 13. As will be understood, in accordance with this system, the hydrocarbons are subjected to vapor phase treatment in the clay columns.

As illustrative of a system for subjecting the hydrocarbons to treatment in liquid phase, I show at 32 a heater in which cracked pressure distillate or gasoline is heated to a proper temperature for treatment by the clay, for example from 200° to 400° F., and discharged through lines 33 and 13 to the on-stream clay column.

Aluminum chloride vapors are supplied to the clay towers 11 from a suitable generator 34, shown typically and simply as a shell-type retort. The shell 35 is charged with solid aluminum chloride and the salt is heated to a temperature above its vaporizing temperature, say in the neighborhood of 360° to 375° F., or above, and the vapors are delivered to one or the other of the clay towers through line 36 and branches 37, under control of valves 38.

In operation, while the hydrocarbon is undergoing treatment by passage through one of the towers 11, the other is taken off stream by closing one each of the valves 15 and 17. The treated hydrocarbons leave the on-stream clay column through line 16, and where the hydrocarbons are treated in vapor phase, the vapors are conducted through line 18 to condenser 39 and the condensate run to the receiver 40. Aluminum chloride vapors are then passed into the body of clay in the off stream tower for a length of time sufficient to permit the vaporized salt to thoroughly permeate the entire body of clay. During this time, valve 41 in line 42 of the tower into which the aluminum chloride vapors are being introduced, may be kept open. Since the clay temperature is below the vaporizing temperature of the salt, the aluminum chloride vapors will condense within the body of clay, and in its condensed form, the salt will be in a fine state of division, deposited both within the interstices between clay particles, and within pores of the particles themselves. In this manner, I am able to obtain an intimate and thorough distribution of the aluminum chloride within the clay, as is desirable for most effective treatment of the oil, and I am able thus to incorporate the finely divided salt in the clay while it remains in the treating chamber and without having to resort to any washing or pulverizing operations to further condition the clay for a subsequent run.

As will be understood, after the clay within one of the towers 11 has been properly conditioned as described, the oil stream may be cut into that tower as the clay in the other tower has become spent, whereupon the said other tower is closed from the oil supply line and opened to communication with the aluminum chloride vapor line, to condition the clay for a successive run. It may be mentioned that in order to reduce the tendency for localized condensation to occur, the aluminum chloride vapors may be introduced while the clay retains heat from the hydrocarbons previously passed through it, but is below the vaporizing temperature of the salt.

In certain installations it may be desirable to supply heat to the clay independently of the heat supplied by the aluminum chloride vapors, for the purpose of avoiding excessive condensation of the salt within the lower or localized portion of the clay body, to the end that the salt finally will be deposited in a condition of more thorough and uniform distribution throughout the entire body of clay. Thus, I may heat the clay before or during passage of the aluminum chloride vapors into it, from an extraneous source of heat supply, for example by placing about the tower a jacket 43, see Fig. 2, through which a suitable heating medium, such as steam, is passed from the inlet 44 to the outlet 45. Where the clay is thus extraneously heated, I prefer to maintain the clay temperature at or just below the vaporizing temperature of the aluminum chloride. As a further aid in securing uniform distribution of the condensed salt within the body of clay, I may subject the clay, either with or without extraneous heating, to agitation while being impregnated with the aluminum chloride vapors. As shown in Fig. 3, I may place within the tower a suitable agitator, typically a motor driven shaft 46 carrying a series of paddles 47, which maintain the clay in a state of agitation while undergoing treatment by the aluminum chloride vapors introduced through line 37, as previously explained.

I claim:

1. The process of refining petroleum hydrocarbons that includes, passing heated hydrocarbons through a body of adsorptive material contained in a treating zone and impregnated with a salt of the group consisting of zinc chloride and aluminum chloride, recharging the adsorptive material with said salt while said material remains in the treating zone, by discontinuing the flow of hydrocarbons through said zone, vaporizing a quantity of the salt in a heating zone and passing the vapors into said material, condensing the vapors directly on the surface and within the pores of the material while maintaining the material in heated condition to promote uniformity of the salt condensation throughout the body of material, and thereafter again passing the hydrocarbons through said material.

2. The process of refining petroleum hydrocarbons that includes, passing heated hydrocarbons through a body of adsorptive material contained in a treating zone, impregnating said material while it remains in said treating zone, with a salt of the group consisting of zinc chloride and aluminum chloride, by discontinuing the flow of hydrocarbons through said zone, vaporizing a quantity of the salt in a heating zone and passing the vapors into said material, condensing the vapors directly on the surface and within the pores of the material while the material retains substantial heat supplied by the heated hydrocarbons but is maintained at a temperature below the temperature of said vapors, and thereafter again passing the hydrocarbons through the material.

3. The process of refining petroleum hydrocarbons that includes, passing heated hydrocarbons through a body of adsorptive material contained in a treating zone and impregnated with a salt of the group consisting of zinc chloride and aluminum chloride, recharging the material with said salt while the material remains in said treating zone, by discontinuing the flow of hydrocarbons through said zone, vaporizing a quantity of the salt in a heating zone and passing the vapors into said material while agitating the material, condensing the salt directly on the surface and within the pores of the material while maintaining the material in heated condition to promote uniformity of the salt condensation throughout the body of material, and thereafter again passing the hydrocarbons through the material.

4. The process of refining hydrocarbons that includes, vaporizing hydrocarbons and passing the vapors through a body of adsorptive material contained in a treating zone and impregnated with aluminum chloride, recharging the adsorptive material with the aluminum chloride while said material remains in the treating zone, by discontinuing the flow of vapors through said zone, vaporizing a quantity of the aluminum chloride in a heating zone and passing the vapors into said material, condensing the aluminum chloride vapors directly on the surface and within the pores of the material while maintaining the material in heated condition to promote uniformity of the aluminum chloride condensation throughout the body of material, and thereafter again passing the hydrocarbons through said material.

5. The process of refining hydrocarbons that includes, passing heated liquid hydrocarbons through a body of adsorptive material contained in a treating zone and impregnated with aluminum chloride, recharging the adsorptive material with the aluminum chloride while said material remains in the treating zone, by discontinuing the flow of hydrocarbons through said zone, vaporizing a quantity of the aluminum chloride in a heating zone and passing the vapors into said material, condensing the aluminum chloride vapors directly on the surface and within the pores of the material while maintaining the material in heated condition to promote uniformity of the aluminum chloride condensation throughout the body of material, and thereafter again passing the hydrocarbons through said material.

WILLIAM T. HANCOCK.